United States Patent [19]

Ireland

[11] 3,747,514

[45] July 24, 1973

[54] FRUIT STEMMER
[75] Inventor: Frederick P. Ireland, Stayton, Oreg.
[73] Assignee: Stayton Canning Company Cooperative, Stayton, Oreg.
[22] Filed: Sept. 14, 1971
[21] Appl. No.: 180,388

[52] U.S. Cl. .................................................. 99/640
[51] Int. Cl. ............................................ A23n 15/02
[58] Field of Search ....................... 146/55; 99/640

[56] References Cited
UNITED STATES PATENTS
3,036,613    5/1962    Minera .................................. 146/55

Primary Examiner—Willie G. Abercrombie
Attorney—Clarence A. O'Brien and Harvey B. Jacobson

[57] ABSTRACT

Intermeshing, helical formations on a plurality of parallel rollers, driven in opposite rotational directions, grip the stems of fruit in contact therewith and detach the stems while conveying the fruit toward the delivery ends of the rollers. The rollers are supported at the delivery ends by space bearings between which debris passes.

8 Claims, 6 Drawing Figures

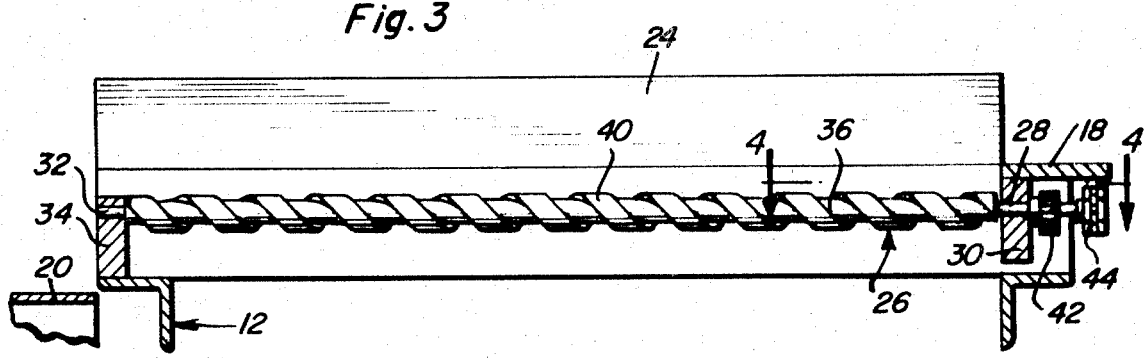
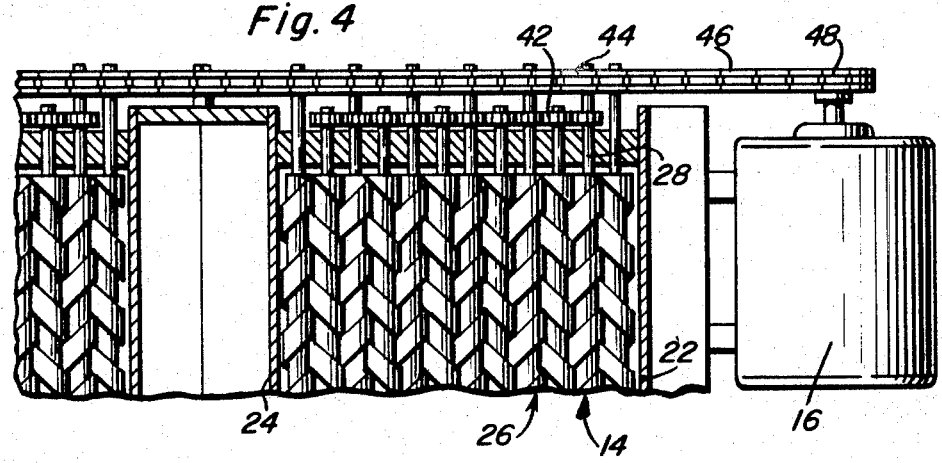
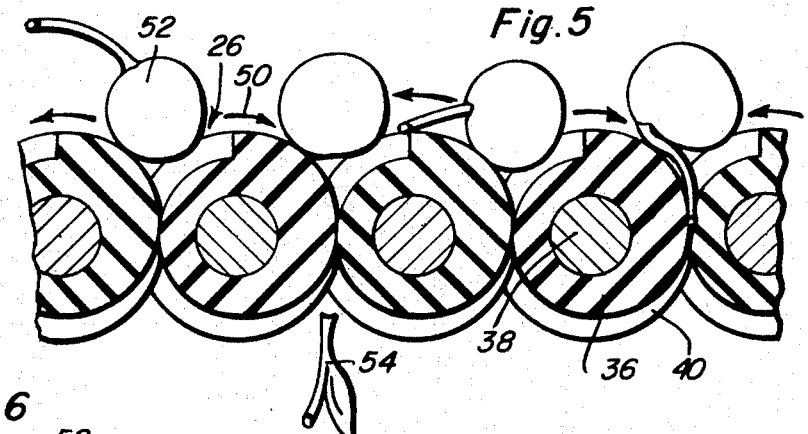
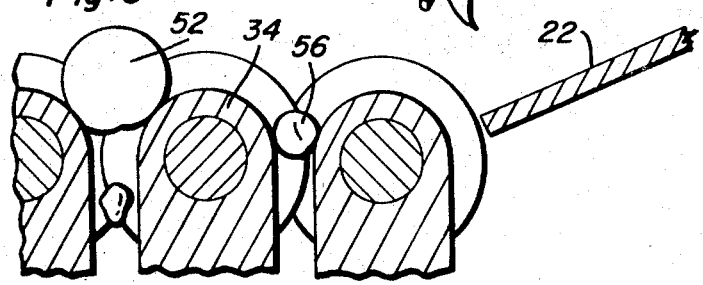

FRUIT STEMMER

This invention relates to apparatus for processing ovate objects, such as fruit and vegetables, and more particularly to apparatus for destemming fruits and vegetables.

In the handling of crops, such as fruits and vegetables on a large scale, it is desirable to have efficient means to detach stems or vines. Although various machines have been devised for handling harvested crops of the type with which the present invention is concerned, they are relatively complex and serve only on an optional basis to destem the crop. Thus, such prior machines have not been particularly efficient with respect to the crop destemming function. It is, therefore, an important object of the present invention to provide apparatus primarily designed to remove attached material from harvested crops as well as to convey or feed the crop while being operated on.

In accordance with the present invention, a plurality of rubber rollers having helical or spiral formations, are mounted for rotation in opposite directions about parallel spaced axis. The helical formations intermesh so as to support the fruit or vegetables thereabove and feed them longitudinally along the axes of the rollers toward a delivery end without assistance from other conveying facilities. At the same time, the intermeshing helical formations grip solid matter attached to the fruit or vegetables, such as the stems or vines, and draw them downwardly for detachment, together with any other foreign material capable of being drawn between the pliable material from which the rollers are made. The intermeshing helical formations terminate in spaced relation to the delivery ends of the rollers at which locations the rollers are rotationally supported by spaced bearings. The clearance between the spaced bearings is such as to permit the passing of debris too large to be drawn through the rollers, although spaced close enough to prevent the fruit and vegetables from dropping therebetween. Thus, the destemmed fruit and vegetables are discharged from the delivery ends of the rollers.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a side sectional view taken substantially through a plane indicated by section line 3—3 in FIG. 1;

FIG. 4 is a partial top sectional view taken substantially through a plane indicated by section line 4—4 in FIG.3;

FIG. 5 is an enlarged partial transverse sectional view taken substantially through a plane indicated by section line 5—5 in FIG. 1; and FIG. 6 is an enlarged partial transverse sectional view taken substantially through a plane indicated by section line 6—6 in FIG. 1.

Figure 1:
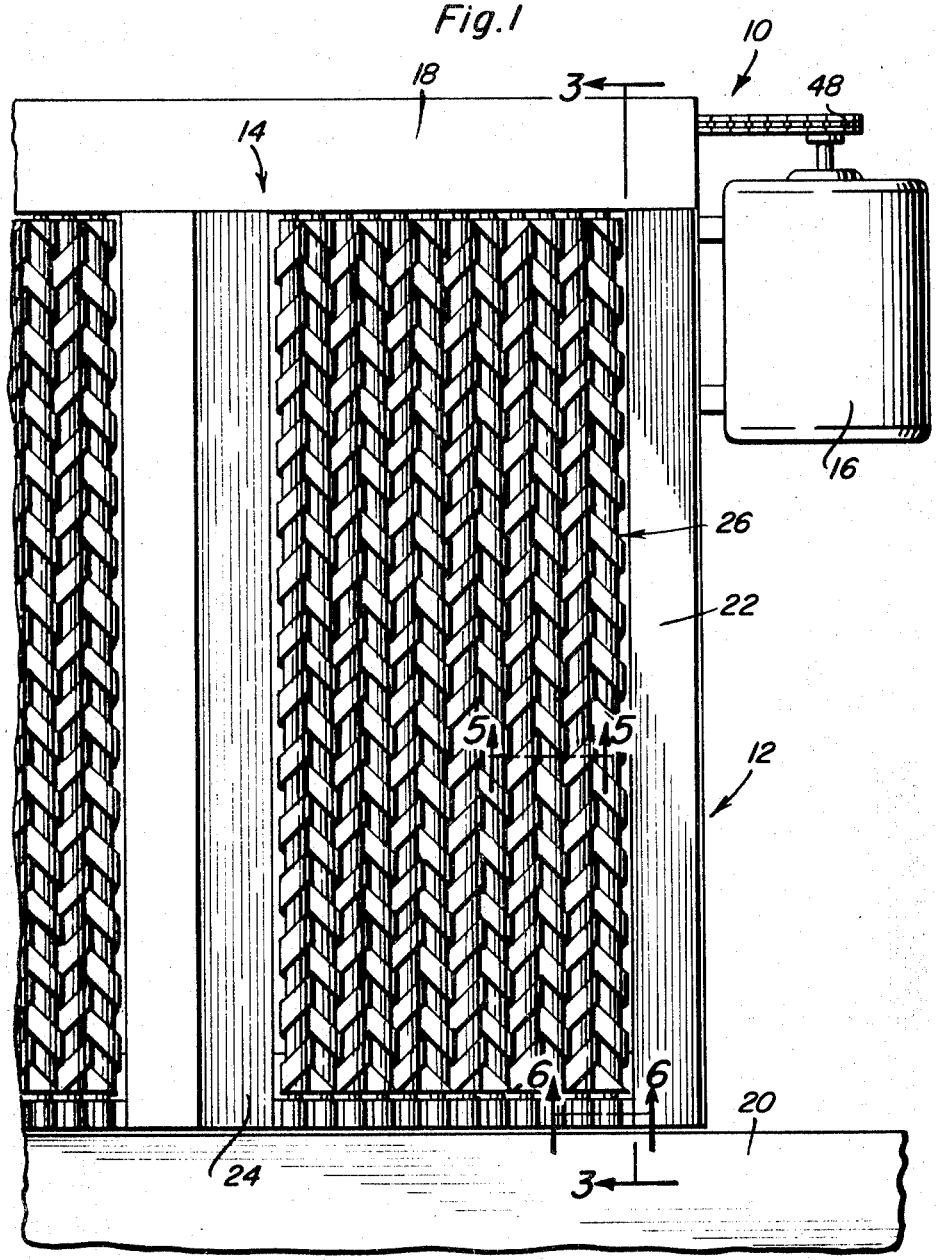
FIG. 1 is a partial top plan view of a detaching machine constructed in accordance with the present invention.
Figure 2:
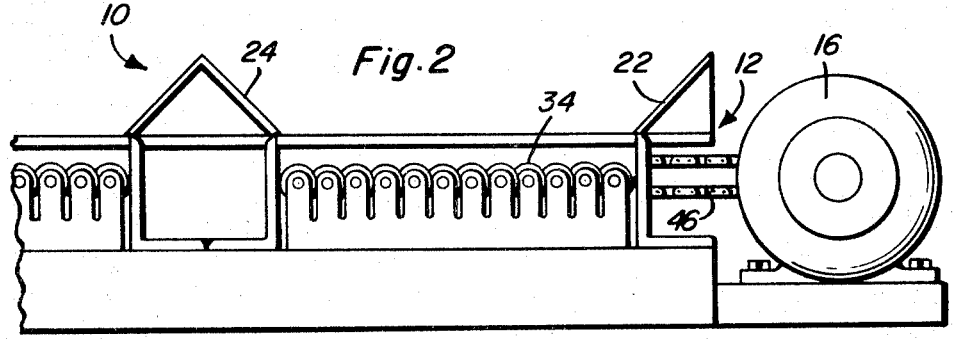
FIG. 2 is a partial end view of the machine shown in FIG. 1.

Referring now to the drawings in detail, the fruit and vegetable detaching device of the present invention is generally referred to by reference numeral 10 in FIGS. 1 and 2. The machine includes a suitable frame generally referred to by reference numeral 12 supporting a plurality of horizontal sections 14, the number of sections depending upon the quantity of crop being handled. An electric drive motor 16 is fixedly mounted adjacent one of the sections 14 for powering the machine by means of a drive arrangement underlying an infeed platform 18 which extends across and interconnects all of the sections 14. Also associated with all of the sections of the machine is a delivery conveyor belt 20 onto which the processed fruit or vegetables are deposited. The fruit or vegetables are loaded onto the machine at the infeed platform 18 between side fences 22 and 24 which are disposed at an angle for confining the fruit and vegetables to the particular section through which they are fed.

Each section of the machine includes a plurality of rollers 26 disposed in parallel spaced relation as shown in FIGS. 1 and 4. Each roller 26, as more clearly seen in FIG. 3, includes a drive shaft end 28 extending through a journal support 30 underlying the infeed platform 18. The delivery end shaft portion 32 is supported by one of a plurality of spaced sleeve bearings 34. Thus, the bearings 30 and 34 at the infeed and delivery ends of each section will rotationally mount the rollers about parallel spaced axes. Each roller furthermore includes a longitudinal body 36, as more clearly seen in FIG. 5, made of a pliable material, such as rubber, mounted on a central drive shaft 38. A helical or spiral formation 40 is formed on the roller body. The helical formations 40 on adjacent rollers are oppositely wound and 180° out of phase with each other so as to intermesh, with the spacing between the rollers being such that the spiral formation on one roller contacts a roller body on an adjacent roller, as shown in FIGS. 1 and 4.

As shown in FIGS. 3 and 4, the rollers are drivingly interconnected with each other through meshing gears 42 secured to the drive ends 28 of the roller shafts. Accordingly, the rollers are rotated in opposite directions. Further, alternate drive shaft ends 28 are extended axially beyond the gears 42 and have affixed thereto sprocket gears 44. The sprocket gears mesh with an endless sprocket chain 46 with which the drive motor is drivingly engaged by means of a drive sprocket 48.

As hereinbefore indicated, the rollers 26 are driven in opposite rotational directions as shown by the arrows 50 in FIG. 5. In view of the intermeshing relationship between the adjacent rollers, fruit or vegetables, such as the cherries 52 are supported on the tops of the rollers and are fed longitudinally along the rollers from the infeed end to the delivery end by the helical formations 40. Thus, the axial width of each helical formation is substantially equal to one-half its helical pitch as shown in FIGS. 1 and 4 so that the formations 40 intermesh without axial clearance to thereby continuously convey the cherries toward the delivery end. Further, as shown in FIG. 5, the stems 54 are gripped between adjacent rollers and drawn downwardly for detaching the same while the cherries are fed along the rollers. Accordingly, destemmed cherries, as shown in FIG. 6, arrive at the delivery end of the rollers and pass over the spaced sleeve bearings 34 onto the delivery conveyor belt 20.

The clearance or spacing between the bearings 34 is such as to continue supporting the cherries 52 above the rollers but are wide enough to permit the gravitational separation or passing of solid debris 56 therebetween, as shown in FIG. 6. Thus, solid debris incapable of being drawn between the roller bodies 36 will drop between the space bearings. It will be furthermore apparent that the rubber material of the roller bodies will compress sufficiently to grip the stems 54 therebetween and will also feed the cherries therealong without damage thereto. Thus, the machine is capable of separating vines or stems from ovate objects and at the same time provide an automatic feed system. The rotational speed of the intermeshing rollers will, of course, determine the capacity of the machine.

The foregoing is considered as illustrative only of the principles of the invention, Further, since numerous modifications and changes will readily occur to those skilled in the art, it is not desired to limit the invention to the exact construction and operation shown and descried, and accordingly all suitable modifications and equivalents may be resorted to, falling within the scope of the invention.

What is claimed is:

1. Apparatus for separating solid matter from a dimensionally larger object to which the solid matter is attached comprising at least two longitudinal rollers having infeed and delivery ends, means mounting the rollers in spaced relation for rotation about fixed axes, helical gripping elements mounted on said rollers in meshing engagement with each other, and means for imparting rotation to said rollers in opposite directions to detach the solid matter from the object, the object being conveyed along the axes of the rollers toward the delivery ends because of said meshing engagement between the helical gripping elements.

2. Apparatus for separating solid matter from a dimensionally larger object to which the solid matter is attached comprising at least two longidutinal rollers, means mounting the rollers in spaced relation for rotation about fixed axes, helical gripping elements mounted on said rollers in meshing engagement with each other, and means for imparting rotation to said rollers in opposite directons to detach the solid matter from the object while conveying the object along the axes of the rollers, said rotation imparting means being drivingly connected to the rollers at an infeed end, said roller mounting means including spaced bearing elements supporting the rollers at a delivery end opposite the infeed end, the spacing between the bearing elements being dimensionally less than the object to permit gravitational separation of loose debris.

3. The combination of claim 2 wherein ssaid helical gripping elements are made of a pliable material compressed by the solid matter drawn downwardly therebetween.

4. The combination of claim 1 wherein said solid matter is a stem of a fruit constituting the object.

5. Apparatus for detaching stems from ovate fruit comprising a plurality of rollers having infeed and delivery ends, a frame rotationably mounting the rollers about parallel spaced axes, pliable means mounted by the rollers in intermeshing relationship to each other for supporting the fruit above the rollers, and drive means imparting rotation to the rollers in opposite directions for gripping the stems between the pliable means to draw the same downwardly and conveying the fruit parallel to said axes toward said delivery ends.

6. Apparatus for detaching stems from ovate fruit comprising a plurality of rollers, a frame rotationably mounting the rollers about parallel spaced axes, pliable means mounted by the rollers in intermeshing relationship to each other for supporting the fruit above the rollers, drive means imparting rotation to the rollers in opposite directions for gripping the stems between the pliable means and drawing the same downwardly, and spaced bearing elements supporting the rollers at said delivery end, the clearance between the bearing elements being dimensionally less than the fruit to permit gravitational separation of loose debris from the destemmed fruit.

7. The combination of claim 6 wherein said pliable means comprises helical elements conveying the fruit along the axes of the rollers from an infeed end to a delivery end in response to rotation of the rollers.

8. Apparatus for separating solid matter from a dimensionally larger object to which the solid matter is attached comprising at least two longitudinal rollers, means mounting the rollers in spaced relation for rotation about fixed axes, helical gripping elements mounted on said rollers in meshing engagement with each other, and means for imparting rotation to said rollers in opposite directions to detach the solid matter from the object, the object being conveyed along the axes of the rollers because of said meshing engagement substantially without any axial clearance along the rollers.

* * * * *